United States Patent
Ong et al.

(10) Patent No.: US 11,288,475 B2
(45) Date of Patent: Mar. 29, 2022

(54) TWO-DIMENSIONAL BARCODE GENERATING METHOD, VERIFICATION METHOD, SERVER AND TWO-DIMENSIONAL BARCODE

(71) Applicant: I-SPRINT INNOVATIONS PTE LTD, Singapore (SG)

(72) Inventors: Chin Phek Ong, Singapore (SG); Wai Keung Ching, Singapore (SG); Tai Kwong Simon Leung, Singapore (SG)

(73) Assignee: I-SPRINT INNOVATIONS PTE LTD, Singapore (SG)

( * ) Notice: Subject to any disclaimer, the term of this patent is extended or adjusted under 35 U.S.C. 154(b) by 0 days.

(21) Appl. No.: 16/964,202

(22) PCT Filed: Nov. 26, 2018

(86) PCT No.: PCT/SG2018/050578
§ 371 (c)(1),
(2) Date: Jul. 23, 2020

(87) PCT Pub. No.: WO2019/156624
PCT Pub. Date: Aug. 15, 2019

(65) Prior Publication Data
US 2021/0042486 A1 Feb. 11, 2021

(30) Foreign Application Priority Data

Feb. 7, 2018 (SG) ............................ 10201801042Q

(51) Int. Cl.
*G06K 7/14* (2006.01)
*G06F 21/60* (2013.01)
*G06K 7/10* (2006.01)

(52) U.S. Cl.
CPC .......... *G06K 7/1417* (2013.01); *G06F 21/602* (2013.01); *G06K 7/10851* (2013.01); *G06K 7/1434* (2013.01)

(58) Field of Classification Search
CPC ............. G06K 7/1417; G06K 7/10851; G06K 7/1434; G06K 7/14; G06K 19/06;
(Continued)

(56) References Cited

U.S. PATENT DOCUMENTS

| 8,297,510 B1 | 10/2012 | Yakshtes et al. |
| 2007/0221732 A1 | 9/2007 | Tuschel et al. |

(Continued)

FOREIGN PATENT DOCUMENTS

| CN | 104392260 A | 3/2015 |
| CN | 105550730 A | 5/2016 |

(Continued)

*Primary Examiner* — Matthew Mikels
(74) *Attorney, Agent, or Firm* — Kilpatrick Townsend & Stockton, LLP

(57) ABSTRACT

The present disclosure provides a two-dimensional barcode generating method, a two-dimensional barcode verification method, a two-dimensional barcode verification server, and a two-dimensional barcode, and relates to the field of two-dimensional barcode. For the two-dimensional barcode provided by the present disclosure, a generic module in an existing two-dimensional barcode has been replaced by an encryption module, wherein the encryption module includes an encryption area and a first identification area. The encryption area contains an encryption identifier recorded therein for verifying the authenticity of the two-dimensional barcode, and the first identification area contains a first recognition identifier recorded therein for presenting information carried by the two-dimensional barcode.

11 Claims, 4 Drawing Sheets

(58) Field of Classification Search
CPC ....... G06K 19/06037; G06K 19/06056; G06K 19/06046; G06F 21/602
See application file for complete search history.

(56) References Cited

U.S. PATENT DOCUMENTS

| | | |
|---|---|---|
| 2012/0256000 A1 | 10/2012 | Cok |
| 2012/0256007 A1 | 10/2012 | Cok |
| 2013/0221105 A1 | 8/2013 | Cheong et al. |
| 2015/0178721 A1* | 6/2015 | Pandiarajan ..... G06K 19/06037 705/75 |
| 2016/0012324 A1 | 1/2016 | Eschbach et al. |
| 2016/0267369 A1 | 9/2016 | Picard et al. |

FOREIGN PATENT DOCUMENTS

| | | |
|---|---|---|
| CN | 105706107 A | 6/2016 |
| JP | 6231233 B1 | 11/2017 |

\* cited by examiner

TWO-DIMENSIONAL BARCODE GENERATING METHOD, VERIFICATION METHOD, SERVER AND TWO-DIMENSIONAL BARCODE

FIELD

The present disclosure relates to the field of two-dimensional barcode, and particularly to a two-dimensional barcode generating method, a two-dimensional barcode verification method, a two-dimensional barcode verification server, and a two-dimensional barcode.

BACKGROUND ART

A two-dimensional barcode is also referred to as a QR code, in which QR is abbreviated from Quick Response, and is an encoding mode that has been highly popular on mobile devices in recent years. A two-dimensional barcode can store more information than a traditional barcode, and can represent more types of data.

A two-dimensional barcode records information of data and symbol in a black-and-white pattern using a particular geometry according to a one rule on a plane (in two-dimensional direction). The two-dimensional barcode denotes literal and numerical information by using several geometries corresponding to a binary system and by ingeniously using, in terms of coding, the concept of "0" and "1" bit streams that constitute the foundation of the internal logic of a computer, and realizes automatic information processing by automatic identification via an image input device or a photoelectric scanning device.

As shown in FIG. 1, a traditional two-dimensional barcode sample is shown. As can be seen from the figure, the two-dimensional barcode consists of a large number of black or white modules. An intelligent device can determine the information carried by the two-dimensional barcode by identification of the positions and colors of all the modules.

DISCLOSURE OF THE PRESENT DISCLOSURE

An object of the present disclosure is to provide a two-dimensional barcode generating method, a two-dimensional barcode verification method, a two-dimensional barcode verification server, and a two-dimensional barcode.

According to a first aspect, an embodiment of the present disclosure provides a two-dimensional barcode including at least one encryption module;

the encryption module includes an encryption area and a first identification area; the encryption area records therein an encryption identifier for verifying the authenticity of the two-dimensional barcode, and the first identification area records therein a first recognition identifier for presenting information carried by the two-dimensional barcode.

In connection with the first aspect, the present disclosure provides a first possible embodiment of the first aspect, in which the two-dimensional barcode further includes at least one noise module that includes a noise area and a second identification area; the noise area records therein a noise identifier for interfering with the verification of the authenticity of the two-dimensional barcode, and the second identification area records therein a second recognition identifier for presenting information carried by the two-dimensional barcode.

In connection with the first aspect, the present disclosure provides a second possible embodiment of the first aspect, in which the degree of similarity between the encryption identifier and the noise identifier is lower than a preset threshold; the degree of similarity between the encryption identifier and the noise identifier is calculated by one or more of the following information: a degree of similarity in shapes between the encryption identifier and the noise identifier, a degree of similarity in positions between the encryption identifier and the noise identifier, a degree of similarity in areas between the encryption identifier and the noise identifier, and a degree of similarity in colors between the encryption identifier and the noise identifier.

In connection with the first aspect, the present disclosure provides a third possible embodiment of the first aspect, in which the two-dimensional barcode includes a plurality of the encryption modules, and/or the two-dimensional barcode includes a plurality of the noise modules.

According to a second aspect, an embodiment of the present disclosure further provides a two-dimensional barcode verification method, including:

acquiring an image of a two-dimensional barcode to be verified;

extracting an image feature in a designated area of the two-dimensional barcode image; an encryption module includes an encryption area and a first identification area; the encryption area records therein an encryption identifier for verifying the authenticity of the two-dimensional barcode, and the first identification area records therein a first recognition identifier for presenting information carried by the two-dimensional barcode; and determining, according to the image feature, whether the two-dimensional barcode image passes the verification.

In connection with the second aspect, the present disclosure provides a first possible embodiment of the second aspect, in which the two-dimensional barcode image is acquired by photographing/scanning a two-dimensional barcode on an object.

In connection with the second aspect, the present disclosure provides a second possible embodiment of the second aspect, in which the step of extracting an image feature in a designated area of the two-dimensional barcode image includes:

extracting, if there are a plurality of encryption modules in the two-dimensional barcode image, image features of a plurality of predetermined positions to acquire a plurality of image features;

the step of determining, according to the image feature, whether the two-dimensional barcode image passes the verification includes:

determining whether the accuracy of at least one image feature exceeds a preset threshold, wherein if the accuracy of at least one image feature exceeds the preset threshold, it indicates that the two-dimensional barcode image verification is passed.

In connection with the second aspect, the present disclosure provides a third possible embodiment of the second aspect, in which the step of extracting an image feature in a designated area of the two-dimensional barcode image includes:

extracting, if there are a plurality of encryption modules in the two-dimensional barcode image, image features of a plurality of predetermined positions to acquire a plurality of image features;

the step of determining, according to the image feature, whether the two-dimensional barcode image passes the verification includes:

determining whether the mean value of the accuracies of all the image features exceeds a preset threshold, wherein if the mean value of the accuracies of all the image features exceeds the preset threshold, it indicates that the two-dimensional barcode recognition is passed.

In connection with the second aspect, the present disclosure provides a fourth possible embodiment of the second aspect, in which the step of extracting an image feature in a designated area of the two-dimensional barcode image includes:

extracting, if there are a plurality of encryption modules in the two-dimensional barcode image, image features of a plurality of predetermined positions to acquire a plurality of image features;

the step of determining, according to the image feature, whether the two-dimensional barcode image passes the verification includes:

determining whether the accuracy of at least one image feature exceeds a preset threshold; and determining whether the mean value of the accuracies of all the image features exceeds the preset threshold, wherein if the accuracy of at least one image feature exceeds the preset threshold and the mean value of the accuracies of all the image features exceeds the preset threshold, it indicates that the two-dimensional barcode recognition is passed.

In connection with the second aspect, the present disclosure provides a fifth possible embodiment of the second aspect, in which the step of extracting an image feature in a designated area of the two-dimensional barcode image includes:

extracting, if there are a plurality of encryption modules in the two-dimensional barcode image, image features of a plurality of predetermined positions to acquire a plurality of image features;

the step of determining, according to the image feature, whether the two-dimensional barcode image passes the verification includes:

determining whether the accuracy of at least one image feature exceeds a first threshold; and determining whether there is an image feature that has an accuracy lower than a second threshold, wherein if the accuracy of at least one image feature exceeds the first threshold and none of the image features has an accuracy lower than the second threshold, it indicates that the two-dimensional barcode recognition is passed.

In connection with the second aspect, the present disclosure provides a sixth possible embodiment of the second aspect, in which the accuracies of the image features are determined by a step of:

determining the accuracy of the image features according to the degree of similarity between the image feature and reference feature; the degree of similarity including one or more of the following: a degree of similarity in shapes, a degree of similarity in sizes, a degree of similarity in positions and a degree of similarity in colors.

According to a third aspect, an embodiment of the present disclosure further provides a two-dimensional barcode verification server, where the server is configured to execute a corresponding operation according to the method of the second aspect.

According to a fourth aspect, an embodiment of the present disclosure further provides a two-dimensional barcode generating method, including:

generating an encryption module; where the encryption module includes an encryption area and a first identification area; the encryption area records therein an encryption identifier for verifying the authenticity of a two-dimensional barcode, and the first identification area records therein a first recognition identifier for presenting information carried by the two-dimensional barcode; and generating a two-dimensional barcode; where the two-dimensional barcode includes at least one encryption module.

In connection with the fourth aspect, the present disclosure provides a first possible embodiment of the fourth aspect, in which the method further includes:

generating a noise module; where the two-dimensional barcode includes at least one noise module that includes a noise area and a second identification area; the noise area records therein a noise identifier for interfering with the verification of the authenticity of the two-dimensional barcode; and the second identification area records therein a second recognition identifier for presenting information carried by the two-dimensional barcode; the two-dimensional barcode further includes at least one noise module.

In connection with the fourth aspect, the present disclosure provides a second possible embodiment of the fourth aspect, in which the degree of similarity between the encryption identifier and the noise identifier is lower than a preset threshold; the degree of similarity between the encryption identifier and the noise identifier is calculated by one or more of the following information: a degree of similarity in shapes between the encryption identifier and the noise identifier, a degree of similarity in positions between the encryption identifier and the noise identifier, a degree of similarity in areas between the encryption identifier and the noise identifier, and a degree of similarity in colors between the encryption identifier and the noise identifier.

In connection with the fourth aspect, the present disclosure provides a third possible embodiment of the fourth aspect. In which the method further includes: adjusting the shape and/or the area of the encryption identifier and the noise identifier according to a printing area of the two-dimensional barcode; where a target area ratio is negatively correlated with the printing area of the two-dimensional barcode; the target area ratio is a ratio of the area of the encryption identifier/noise identifier to the printing area of the two-dimensional barcode.

In the two-dimensional barcode as provided by the embodiments of the present disclosure, a generic module in an existing two-dimensional barcode has been replaced with an encryption module, wherein the encryption module includes an encryption area and a first identification area. The encryption area records therein an encryption identifier for verifying the authenticity of the two-dimensional barcode, and the first identification area records therein a first recognition identifier for presenting information carried by the two-dimensional barcode. As a result, when the two-dimensional barcode is in use, the first recognition identifier can transmit information of the modules in the existing generic two-dimensional barcode, and the encryption area is used for recognizing the two-dimensional barcode. Since the encryption module has the same size to that of a generic module in the related art, the encryption identifier would be even smaller. Therefore, a counterfeiter cannot accurately obtain the features of the encryption identifier by means of photographing, which ensures that the encryption identifier cannot be easily counterfeited, and improves the safety during the verification of the two-dimensional barcode.

In order to make it easier to understand the objects, features and advantages of the present disclosure, detailed description is made below in connection with some embodiments with a reference to the accompanying drawings.

BRIEF DESCRIPTION OF DRAWINGS

The embodiments of the present disclosure are described in the brief description is made below on the drawings

DETAILED DESCRIPTION OF EMBODIMENTS

Figure 1:
FIG. 1 is a schematic diagram of a generic two-dimensional barcode in the related art.

The technical solutions in the embodiments of the present disclosure are clearly and completely described below with reference to the drawings in the embodiments of the present disclosure. Apparently, the described embodiments are merely part, but not all, of the embodiments of the present disclosure. The components in the embodiments of the present disclosure described and illustrated in the drawings herein may be generally arranged and designed in a variety of different configurations. Accordingly, the following detailed description on the embodiments provided in the drawings is not intended to limit the scope of the claimed disclosure, but merely represents selected embodiments of the present disclosure.

In recent years, the utilization rate of two-dimensional barcodes is greatly increased. For example, a WeChat two-dimensional barcode is used for adding friends, or making payments through a two-dimensional barcode.

A generic two-dimensional barcode is composed of a large number of modules that are usually black or white, to transmit information through the black and white modules arranged according to a preset rule. These black and white modules are the smallest devices for two-dimensional barcode information transmission in the related art. Some merchants in the related art use the two-dimensional barcodes to verify the authenticity of the products.

For example, a two-dimensional barcode can be carried on a commodity, and a user can send a verification request to a server by scanning the two-dimensional barcode, and then the authenticity of the commodity will be verified by the server.

Some counterfeiters will photograph the two-dimensional barcodes, and put the two-dimensional barcodes on the counterfeits to pretend to be the genuine ones.

However, the inventor of the present application has found that this method is not ideal in practice. Accordingly, the inventor of the present application provides a two-dimensional barcode, and a two-dimensional barcode generating method and verification method. The two-dimensional barcode will be firstly described below. The two-dimensional barcode includes at least one encryption module:

the encryption module including an encryption area and a first identification area. The encryption area records therein an encryption identifier for verifying the authenticity of the two-dimensional barcode, and the first identification area records therein a first recognition identifier for presenting information carried by the two-dimensional barcode.

In one embodiment, in the two-dimensional barcode provided by the present application, the main difference lies in that a generic module has been replaced in situ with an encryption module (while the generic module is a pure-black or pure-white module, the encryption module is a module obtained by further dividing the generic module into smaller parts) so that the two-dimensional barcode can be verified through the encryption module. Moreover, the encryption module not only serves the function of encryption (mainly exerted by the encryption identifier), but also serves the function of information transmission (mainly exerted by the first recognition identifier) a generic module serves in the related art.

Figure 2:
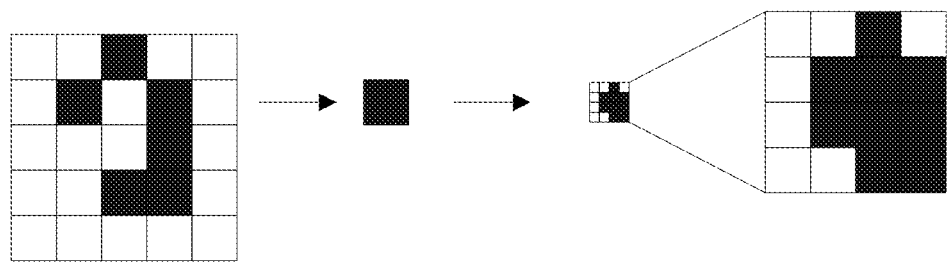
FIG. 2 is a schematic diagram directed to conversion of a generic module in a generic two-dimensional barcode into an encryption module in a two-dimensional barcode as provided by the present application.

FIG. 2 is a schematic diagram directed to conversion of a module in a generic two-dimensional barcode (referring to the left graph in FIG. 2, in which part of a two-dimensional barcode in the related art is shown, and it can be seen that the two-dimensional barcode in the related art is composed of black modules and white modules that are arranged in an array) into an encryption module (referring to the right graph in FIG. 2, in which a specified encryption module in the two-dimensional barcode provided by the present application is shown) in the two-dimensional barcode provided by the present application.

As shown in FIG. 2, the left graph in FIG. 2 is only part of a traditional two-dimensional barcode, and any black or white square in the left graph is a generic module. Generally speaking, generic modules are either black or white. However, in one embodiment, the generic modules can also be colored or in other forms. In FIG. 2, the two graphs connected by the left arrow demonstrate that a black generic module is taken out from the traditional two-dimensional barcode. In FIG. 2, the two graphs connected by the right arrow show the process of converting the white generic module into an encryption module in the present application (the encryption module is composed of a 4*4 matrix). In FIG. 2, the rightmost diagram shows the amplified encryption module (the amplification of the encryption module serves a purpose of obtaining a better view of the encryption module; actually, the size of the encryption module is the same as that of a module in the traditional technology).

Referring to the rightmost graph (the schematic diagram of the encryption module) in FIG. 2, it can be seen that the rightmost diagram in FIG. 2 is also composed of black and white squares. In a one embodiment, in the encryption module shown in FIG. 2, the area formed by four squares in the center is used as the first identification area, and the area formed by the squares surrounding the first identification area is used as the encryption area (of course, the position, the shape and the color of the encryption identifier and the first recognition identifier can be adjusted; for example, the encryption identifier can be round, triangular, etc., and the first identification area can also be adjusted in a similar manner accordingly). As can be seen, the color of the first identification area is the same as the color of a generic module. This is because the function of the first recognition identifier is to transmit information of the previously existing generic module, and only when the color of the first identification area is the same as the color of the generic module, can it be ensured that the encryption module can effectively transmit the information of the generic module (the position and the shape of the first recognition identifier can, to some degree, be flexibly adjusted). It is even more flexible to set the position, shape and color of the encryption identifier, which can be specified according to the specific needs of the user. For example, in the embodiment shown in FIG. 2, five out of all twelve squares are set as black color, and the remaining seven squares are set as white color. In this way, at the time of scanning the two-dimensional barcode, the encryption identifier can also be scanned together with the first recognition identifier. As a result, if the shape, position and color of the encryption identifier meet the preset requirements, it indicates that the two-dimensional barcode is genuine.

In practical use, a counterfeiter usually acquires an image of a two-dimensional barcode by photographing the two-dimensional barcode. However, in the two-dimensional barcode provided by the present application, at least a generic module was replaced with an encryption module, and the encryption module is composed of an encryption area and a first identification area that have a smaller area. Thus, due to the camera resolution, the camera of the counterfeiter normally cannot clearly capture the details of the encryption identifier in the encryption module (the inadequate resolution of the camera will cause one deformation of the encryption identifier). As a result, in the printout of the captured picture of the two-dimensional barcode from the counterfeiter, the encryption identifier in the printed (in the printing process, the encryption identifier is usually deformed to a one extent) two-dimensional barcode will be deformed. Or in other words, the encryption identifier printed out by the original drawing (the drawing owned by the manufacturer of genuine products) is not completely the same to the encryption identifier printed out from a picture (the picture the counterfeiter obtained by photographing the two-dimensional barcode printed on the genuine products) of the two-dimensional barcode photographed. As a result, due to the difference between the two-dimensional barcode on the genuine product and the two-dimensional barcode on the counterfeit product, the encryption identifier of the two-dimensional barcode made by the counterfeiter cannot pass the verification, achieving the object of distinguishing between the genuine product and the counterfeit product.

Figure 3:
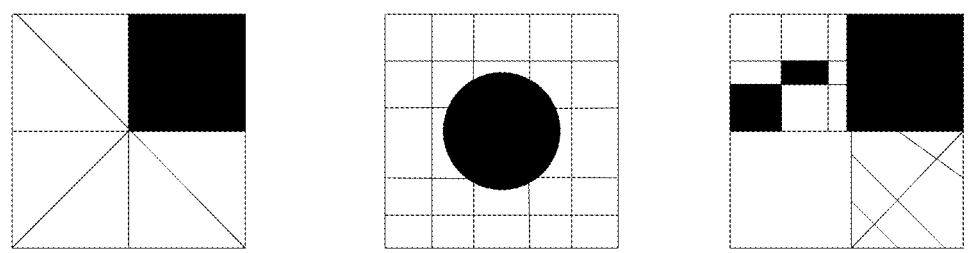
FIG. 3 shows three other forms of the encryption module as shown in FIG. 2.

FIG. 3 shows three other forms of the encryption module shown in FIG. 2 (the rightmost graph in FIG. 2). In the left graph in FIG. 3, the area at the upper right corner is the first identification area (which has been painted black), and the rest of the area is the encryption area (any triangle in the encryption area can be painted black or pained by any other color according to the setting). In the middle graph in FIG. 3, the central circular area is the first identification area (which has been painted black), and the rest of area is the encryption area (the squares or incomplete squares in the encryption area can be painted black or pained by any other color according to the setting). In the right graph of FIG. 3, the area at the upper right corner is the first identification area (which has been painted black), and the rest of area is the encryption area (any enclosed area in the encryption area can be painted black or pained by any other color according to the setting). The specific embodiments of the three encryption modules shown in FIG. 3 are merely examples, and the shape, the position and the color of a specific encryption area can be adjusted arbitrarily according to needs. Similarly, the shape, the position and the color of the first identification area can be adjusted arbitrarily according to the needs.

In order to improve safety, it is possible to further provide a noise module in addition to the encryption module. In one embodiment, the two-dimensional barcode provided by the present application further includes at least one noise module that includes a noise area and a second identification area. The noise area records therein a noise identifier for interfering with the verification of the authenticity of the two-dimensional barcode, and the second identification area records therein a second recognition identifier for presenting information carried by the two-dimensional barcode. The degree of similarity between the encryption identifier and the noise identifier is lower than a preset threshold. The degree of similarity between the encryption identifier and the noise identifier is calculated by one or more of the following information: a degree of similarity in shapes between the encryption identifier and the noise identifier, a degree of similarity in positions between the encryption identifier and the noise identifier, a degree of similarity in areas between the encryption identifier and the noise identifier, and a degree of similarity in colors between the encryption identifier and the noise identifier.

Similar to the encryption module, the specific description of the noise module can be referred to the preceding description on the encryption module. In the two-dimensional barcode of the present embodiment, a generic module has also been replaced in situ with a noise module, and the precision of verification is improved through the noise module. Moreover, the noise module not only serves the function of improving verification precision (mainly exerted by the noise identifier), but also serves the function of information transmission (mainly exerted by the second recognition identifier) exerted by a generic module in the related art.

It should be noted that the degree of similarity between the encryption identifier and the noise identifier is lower than the preset threshold. This is to ensure the accuracy of verification. If the encryption identifier and the noise identifier are too similar, there is not much point for the presence of the noise identifier. In one embodiment, the degree of similarity in shapes between the encryption identifier and the noise identifier can be obtained by: overlapping the encryption identifier and the noise identifier to obtain an overlapping area (generally referred to as the maximum value of the overlapping area) and then calculating the degree of similarity in shapes according to the overlapping area, the area of the encryption identifier and the area of the noise identifier. When there are a plurality of encryption identifiers and a plurality of noise identifiers, it is possible to first establish a correlation between each of the encryption identifiers and each of the noise identifiers (generally, one encryption identifier corresponds uniquely to one noise identifier, and one noise identifier corresponds uniquely to one encryption identifier), and then calculate the degree of similarity in shapes between the encryption identifier and the noise identifier in each correlation, and finally add up the degrees of similarity in shapes in all of the correlations to obtain the final degree of similarity in shapes between the encryption identifiers and the noise identifiers.

The degree of similarity in positions between the encryption identifier and the noise identifier is calculated according to the distance between the encryption identifier and the noise identifier. When there are a plurality of encryption identifiers and a plurality of noise identifiers, it is possible to first establish a correlation between each of the encryption identifiers and each of the noise identifiers (generally, one encryption identifier corresponds uniquely to one noise identifier, and one noise identifier corresponds uniquely to one encryption identifier), then calculate the distance between the encryption identifier and the noise identifier in each correlation and add up the calculated distances to obtain the distances between the encryption identifiers and the noise identifiers, and finally calculate the degree of similarity in positions between the encryption identifiers and the noise identifiers according to the sum or the mean value of the distances.

The degree of similarity in areas between the encryption identifier and the noise identifier can be obtained just by direct comparison of areas. For example, first calculating the difference between the encryption identifier and the noise identifier, and then calculating the ratio of the difference to the area of the encryption identifier and/or the area of the noise identifier, and finally determining the degree of similarity in area according to the ratio. There are a number of specific methods for calculating the degree of similarity in area, which, however, are not described in an exhaustive manner herein.

The degree of similarity in colors between the encryption identifier and the noise identifier is calculated based on the color difference between the encryption identifier and the noise identifier, and/or the brightness of the encryption identifier and the noise identifier. Similar to the calculation methods of the preceding two elements, when there are a plurality of encryption identifiers and a plurality of noise identifiers, it is possible to first establish a correlation between each of the encryption identifier and each of the noise identifiers, then calculate the color difference between the encryption identifier and the noise identifier in each correlation, and finally calculate the degree of similarity in colors between the encryption identifier and the noise identifier according to the sum or the mean value of the color differences in the correlations.

In practical use, the noise module does not need to be recognized.

Thus, at the time of verifying the authenticity, it is possible to only recognize the area where the encryption module is located, and not to recognize the noise module. As the counterfeiter cannot distinguish the encryption module from the noise module, the coexistence of the noise module and the encryption module in a single two-dimensional barcode will greatly improve the difficulty in counterfeiting against the counterfeiter.

It should be noted that the noise area can only occupy part of the noise module (the ratio of the area of the noise area to the overall area of the noise module can be adjusted according to the needs). The encryption area can only occupy part of the encryption module (the ratio of the area of the encryption area to the overall area of the encryption module can be adjusted according to the needs).

In one embodiment, in order to further improve the safety of the two-dimensional barcode, multiple encryption modules are provided. In this way, after the encryption modules are recognized, it is possible to first recognize the area corresponding to each of the encryption modules and calculate the accuracy of each recognition result (the degree of similarity between the identification result and the reference), and then determine, according to the accuracy of each recognition result, whether the two-dimensional barcode recognition is passed.

Figures 4, 5:
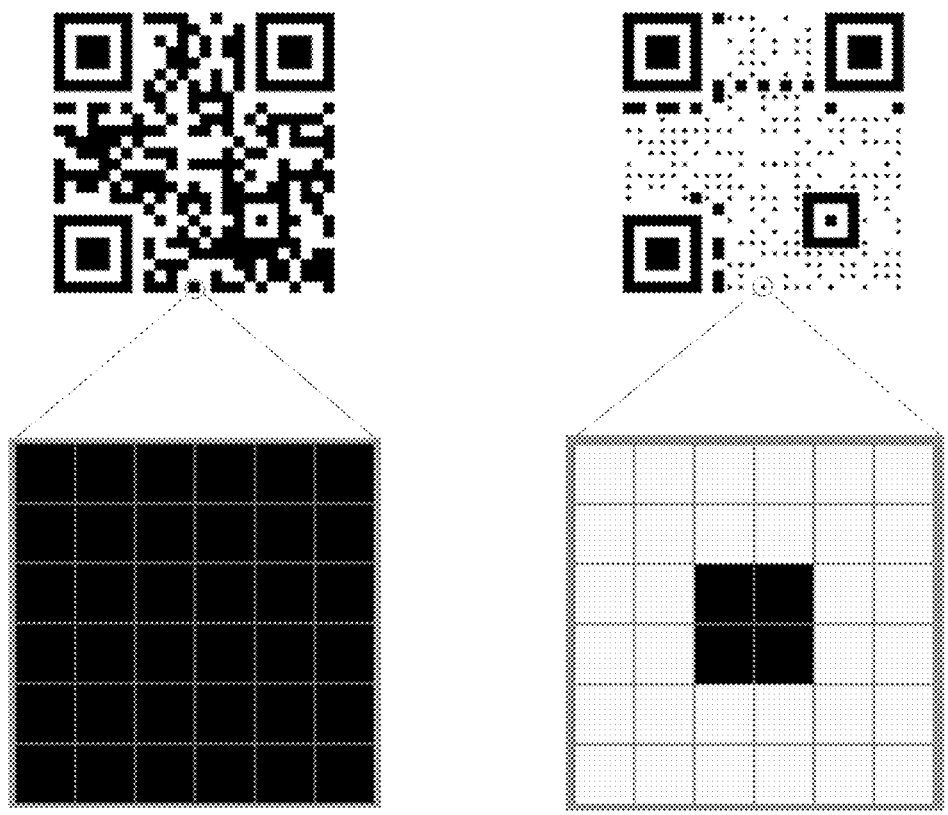
FIG. 4 is a schematic diagram of comparison between a traditional two-dimensional barcode (the left two graphs in FIG. 4) and the two-dimensional barcode as provided by the present solution (the right two graphs in FIG. 4)
FIG. 5 shows an encryption module that was obtained by subjecting the encryption module (the graph at the lower right corner of FIG. 4) in FIG. 4 to the encryption processing.

FIG. 4 is a schematic diagram for comparison between a traditional two-dimensional barcode (the left two graphs in FIG. 4) and the two-dimensional barcode (the right two graphs in FIG. 4) provided by the present embodiment. In FIG. 4, the left two graphs showed an enlarged view of a module in a traditional two-dimensional barcode (in FIG. 4, the graph at the upper left corner is an overall view of the traditional two-dimensional barcode, and the graph at the lower left corner is an enlarged view of a generic module of the traditional two-dimensional barcode). As can be seen, in the traditional two-dimensional barcode, one module only has one color (e.g., black or white). For the two-dimensional barcode in the present embodiment (the right two graphs in FIG. 4), the overall structure is substantially the same as that of a traditional two-dimensional barcode, but most of the modules have been improved, i.e., the generic module in the traditional two-dimensional barcode (the graph at the lower left corner in FIG. 4) is replaced with an encryption module in the present embodiment (the graph at the lower left corner in FIG. 4). As can be seen, the encryption module (the graph at the lower right corner in FIG. 4) is divided into two parts, the central four black squares of the encryption module are the first recognition identifiers (the area where the four black squares are located is the first identification area; however, the first identification area does not have to be filled fully with the first recognition identifiers, that is, the first identification area is not necessarily wholly black, and it is only required that the first identification area is mostly black to allow for essential verification). The area other than the four black squares is the encryption area. It can be seen that the encryption area is also divided into a plurality of squares, and at present stage, no encryption has been performed in the encryption area (the encryption area is white). The encryption module in the embodiment of the present application has the same size and shape as a generic module of a two-dimensional barcode in a traditional embodiment. Thus, in the two-dimensional barcode of the present application, no adjustment was made to the overall architecture of the two-dimensional barcode, and only one or more modules have been changed. As for the specific form of the noise module, it can be referred to the encryption module, and no redundant description will be made herein.

FIG. 5 shows an encryption module obtained by subjecting the encryption module in FIG. 4 (the graph at the lower right corner of FIG. 4) to an encryption processing. As can be seen, in the encryption module that has undergone the encryption processing, the encryption area is divided into black squares and white squares according to a one rule, the black squares are filled with a digit of 1, and the white squares are filled with a digit of 0. These black squares and white squares serve the function of encryption (these black squares and white squares formed the encryption identifiers).

Figure 6:
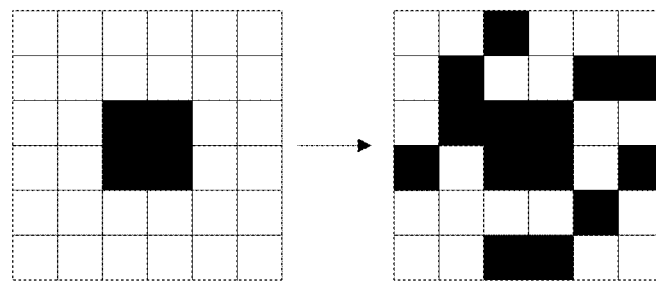
FIG. 6 is a schematic diagram of a noise module in the absence of a noise and a noise module in the presence of a noise.

Similarly, FIG. 6 is a schematic diagram showing a noise module in the absence of a noise and a noise module in the presence of a noise. The left graph in FIG. 6 shows a noise module in the absence of a noise, in which the central four black squares are the second recognition identifiers. The area where the four black squares are located is the second identification area. The area other than the four black squares is the noise area. It can be seen that the noise area is also divided into a plurality of squares, but at the current stage, no noise addition process has been performed in the noise area (the noise area is white). The right graph of FIG. 6 shows a noise module obtained by adding noise to the noise module in the left graph of FIG. 6. The central four black squares remain unchanged. The noise area, like the encryption area, is composed of black squares and white squares, and these black squares and white squares serve the function of noise (these black squares and white squares formed the noise identifiers).

Figure 7:
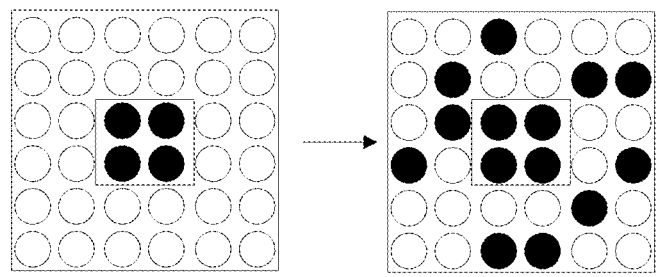
FIG. 7 is a schematic diagram of an alternative embodiment of FIG. 6, and is directed to a noise module in the absence of noise and a noise module in the presence of noise.

FIG. 7 is a schematic diagram of an alternative embodiment of a noise module in the absence of a noise and a noise module in the presence of a noise shown in FIG. 6. The left graph of FIG. 7 is a schematic diagram showing a noise module in the absence of a noise, in which the central four black circles are the second recognition identifiers. The area where the four black circles are located is the second identification area (the area defined by the square surrounding the four black circles is the second identification area). The area other than the second identification area is the noise area. It can be seen that only white circles are present in the noise area, and no noise addition process has been performed. The right graph of FIG. 7 is a schematic diagram showing a noise module obtained by adding a noise to the noise module in the left graph of FIG. 7. The central four black circles remain unchanged. In the noise area, like in the encryption area, the noise identifiers are generated by setting the circles black. These black circles and white circles in the noise area serve the noise function (these black circles and white circles form the noise identifiers). The difference between the noise identifiers shown in FIG. 6 and FIG. 7 lies in that the noise identifiers shown in FIG. 6 are square and the noise identifiers shown in FIG. 7 are circular. Of course, the noise identifier can also be other shapes.

It should be noted that the size (area) of the encryption identifier and the noise identifier in the two-dimensional barcode of the present application is related to the size of the overall printed two-dimensional barcode. Or in other words, the target area ratio is negatively correlated to the printing area of the two-dimensional barcode, wherein the target area ratio is a ratio of the area of the encryption identifier/noise identifier to the printing area of the two-dimensional barcode. That is, the larger is the area of the printed two-dimensional barcode, the smaller is the ratio of the area of the encryption identifier to the printing area of the two-dimensional barcode, and the smaller is the ratio of the area of the noise identifier to the printing area of the two-dimensional barcode. This mainly serves to ensure that the actual printing area of the encryption identifier and the noise identifier is small enough to make it impossible for a camera to capture the encryption identifier and the noise identifier with an accuracy sufficient for the counterfeiter to counterfeit accurately.

Figure 8:
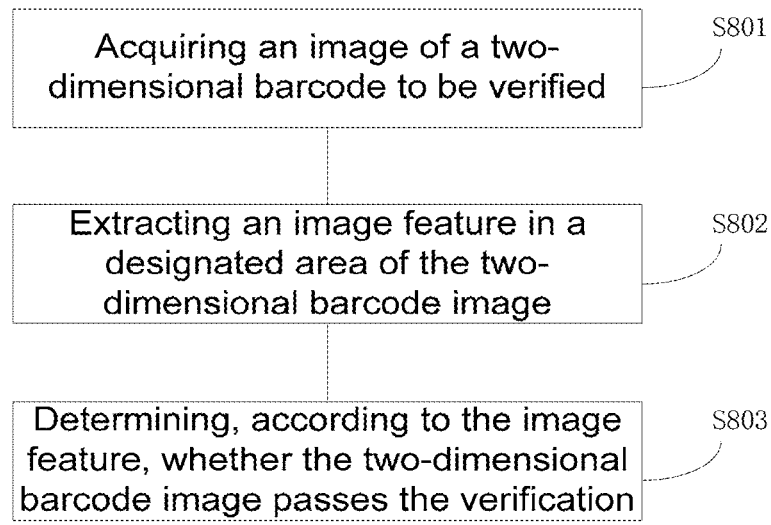
FIG. 8 shows a two-dimensional barcode verification method provided in an embodiment of the description of the present application.

In connection with the two-dimensional barcode disclosed above, the present application further provides a two-dimensional barcode verification method. As shown in FIG. 8, the method includes the steps of:

S801, acquiring an image of a two-dimensional barcode to be verified;

S802, extracting an image feature in a designated area of the two-dimensional barcode image; an encryption module includes an encryption area and a first identification area; the encryption area records therein an encryption identifier for verifying the authenticity of the two-dimensional barcode, and the first identification area records therein a first recognition identifier for presenting information carried by the two-dimensional barcode; and S803, determining, according to the image feature, whether the two-dimensional barcode image passes the verification.

Here, the image feature refers to a result of recognition of the encryption area, e.g., the distribution of the black squares and the white squares, and the shape, the size, the position and the color of the black area. Namely, the image feature includes one or more of the following: shape, size, position and color.

It should be noted that, in S802, at the time of extracting the image feature of the encryption area in the encryption module, the position of the designated area should be known in advance. Since the two-dimensional barcode is generated in a predetermined manner, the mechanism for verification definitely knows where the encryption module is located. Therefore, the image features of the area where the encryption module is located can be simply extracted.

In one embodiment, the two-dimensional barcode image in step 801 is obtained by the following method:

photographing/scanning the two-dimensional barcode on an object to obtain a two-dimensional barcode image. In one embodiment, the two-dimensional barcode on an object is the two-dimensional barcode of the present application. Reference can be made to the description above for the specific features of the two-dimensional barcode.

Further, when there are a plurality of encryption modules (the verification mechanism which executes this method knows in advance whether there are a plurality of encryption modules, and knows where each encryption module is located), the image features at each predetermined position (the position where the encryption module should be located) can be acquired. In this case, there are three methods for recognition.

1. Step S802 can be realized as follows:

extracting, if there are a plurality of encryption modules in the two-dimensional barcode image (the verification mechanism knows in advance whether there are a plurality of encryption modules, and knows where each encryption module is located), image features of a plurality of predetermined positions (the positions where the encryption modules should be located), to acquire a plurality of image features;

Step S803 can be realized as follows:

determining whether the accuracy of at least one image feature exceeds a preset threshold, wherein if the accuracy of at least one image feature exceeds the preset threshold, it indicates that the two-dimensional barcode image verification is passed; otherwise the two-dimensional barcode recognition is not passed.

2. Step S803 can also be performed as follows:

extracting, if there are a plurality of encryption modules in the two-dimensional barcode image (the verification mechanism knows in advance whether there are a plurality of encryption modules, and knows where each encryption module is located), image features of a plurality of predetermined positions (the positions where the encryption modules should be located), to acquire a plurality of image features;

determining whether the mean value of the accuracies of all the image features exceeds a preset threshold, wherein if the mean value of the accuracies of all the image features exceeds the preset threshold, it indicates that the two-dimensional barcode recognition is passed; otherwise the two-dimensional barcode recognition is not passed.

3. Step S803 can also be performed as follows:

extracting, if there are a plurality of encryption modules in the two-dimensional barcode image (the verification mechanism knows in advance whether there are a plurality of encryption modules, and knows where each encryption module is located), image features of a plurality of predetermined positions (the positions where the encryption modules should be located), to acquire a plurality of image features;

determining whether the accuracy of at least one image feature exceeds the preset threshold; and determining whether the mean value of the accuracies of all the image features exceeds the preset threshold;

wherein if the accuracy of at least one image feature exceeds the preset threshold and the mean value of the accuracies of all the image features exceeds the preset threshold, it indicates that the two-dimensional barcode recognition is passed; otherwise the two-dimensional barcode recognition is not passed.

The three methods above can be flexibly selected according to different use conditions. In general, the third one has the highest success rate in preventing counterfeiting, followed by the second one, and the first one has the lowest success rate in preventing counterfeiting.

In order to improve the accuracy in the determination step of the first method, the determination step of the first method can further be carried out as follows:

determining whether the accuracy of at least one image feature exceeds a first threshold; and determining whether there is an image feature that has an accuracy lower than a second threshold;

wherein if the accuracy of at least one image feature exceeds the first threshold and none of the image features has an accuracy lower than the second threshold, it indicates that the two-dimensional barcode recognition is passed; otherwise the two-dimensional barcode recognition is not passed.

In one embodiment, the accuracy of the image features in the encryption area can be calculated as follows:

determining the accuracy of the image features according to the degree of similarity between the image features and the reference features (the actual features in the encryption area of the encryption module that the verification mechanism obtains in advance).

Namely, the reference features also include one or more of the following: shape, size, position and color. By means of weighted calculation, it is possible to determine the degree of similarity between the image features of the encryption area and the reference features, to determine the accuracy (the degree of similarity can be directly used as the accuracy). For example, one or more of the following four calculations can be performed:

calculating the degree of similarity in shapes between the image features and reference features;

calculating the degree of similarity in sizes between the image features and reference features;

calculating the degree of similarity in positions between the image features and reference features; and calculating the degree of similarity in colors between the image features and the reference features.

The degree of similarity is then calculated by one or more of the calculated degree of similarity in shapes, degree of similarity in sizes, degree of similarity in positions and degree of similarity in colors.

In one embodiment, in the two-dimensional barcode verification method, the specific structure of the two-dimensional barcode can be referred to the two-dimensional barcode of the preceding embodiments, and will not be further described herein.

The verification method above is usually executed by a server. Therefore, the present application further provides a server for two-dimensional barcode verification, wherein the server is used for executing the above two-dimension barcode verification method.

Figure 9:
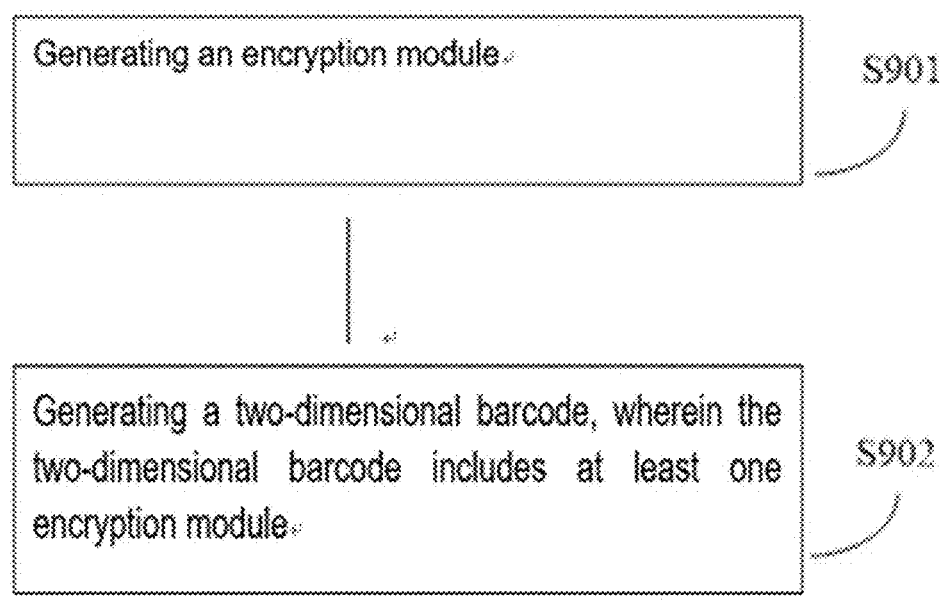
FIG. 9 is a basic flowchart of a two-dimensional barcode generating method provided in an embodiment of the description of the present application.

Correspondingly, the present application further provides a method of generating a two-dimensional barcode. As shown in FIG. 9, the method includes the steps of:

step S901, generating an encryption module, wherein the encryption module includes an encryption area and a first identification area; the encryption area records therein an encryption identifier for verifying the authenticity of a two-dimensional barcode, and the first identification area records therein a first recognition identifier for presenting information carried by the two-dimensional barcode; and step S902, generating a two-dimensional barcode, wherein the two-dimensional barcode includes at least one encryption module.

Figure 10:
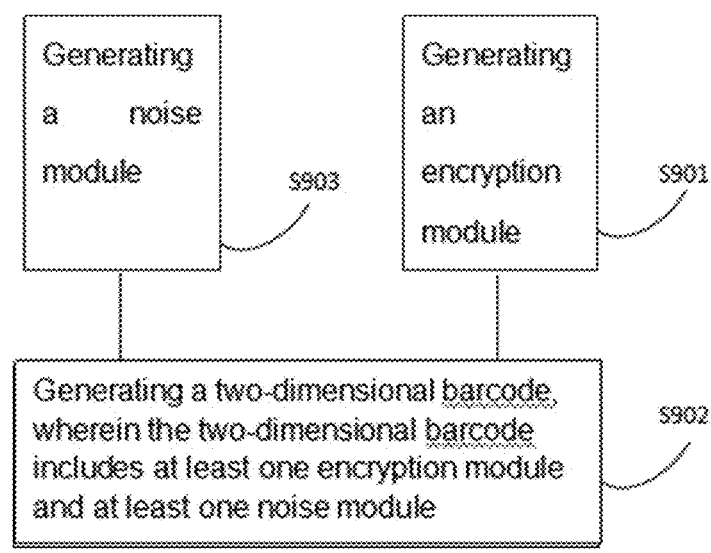
FIG. 10 is an optimization flowchart of a two-dimensional barcode generating method provided in an embodiment of the description of the present application.

In one embodiment, as shown in FIG. 10, on the basis of the solution shown in FIG. 9, the present embodiment further includes:

step S903, generating a noise module; wherein the two-dimensional barcode includes at least one noise module; the noise module includes a noise area and a second identification area; the noise area records therein a noise identifier for interfering with the verification of the authenticity of the two-dimensional barcode, and the second identification area records therein a second recognition identifier for presenting information carried by the two-dimensional barcode; the degree of similarity between the encryption identifier and the noise identifier is lower than a preset threshold; the degree of similarity between the encryption identifier and the noise identifier is calculated by one or more of the following information: a degree of similarity in shapes between the encryption identifier and the noise identifier, a degree of similarity in positions between the encryption identifier and the noise identifier, a degree of similarity in areas between the encryption identifier and the noise identifier, and a degree of similarity in colors between the encryption identifier and the noise identifier. In this case, the two-dimensional barcode includes at least one noise module.

The order for carrying out step 901 and step 902 is interchangeable, and they can be carried out simultaneously or sequentially.

As defined in the foregoing description, in order to ensure the quality of the two-dimensional barcode (not easily counterfeited), the size of the encryption identifier and the noise identifier should be controlled. In one embodiment, the method of generating two-dimensional barcode further includes: adjusting the shape and/or the area of the encryption identifier and the noise identifier according to the printing area of the two-dimensional barcode. In one embodiment, the target area ratio is negatively correlated to the printing area of the two-dimensional barcode, wherein the target area ratio is a ratio of the area of the encryption identifier/noise identifier to the printing area of the two-dimensional barcode.

In one embodiment, in the method of generating a two-dimensional barcode, the specific structure of the two-dimensional barcode can be referred to the two-dimensional barcode of the preceding embodiment, and will not be further described herein.

In one embodiment, for the sake of convenience and conciseness of description, the specific working process of the system, device and device described above can be referred to the corresponding process in the method embodiments, and will not be further described herein.

The device described as a separate component may or may not be physically separated. The component displayed as a device may or may not be a physical device, that is, it may be located at one place, or may be distributed to multiple network devices. Part or all of the devices can be selected to achieve the objects of the respective embodiments according to actual needs.

In addition, the functional devices in each embodiment of the present disclosure can be integrated into one processing device, or they can be physically separate devices, or two or more devices can be integrated into one device.

When the functions are implemented in the form of software functional devices and sold or used as independent products, the functions can be stored in a computer readable storage medium. Based on such understanding, the gist of the present embodiment, the part of the embodiment of the present disclosure that makes contributions to the prior art, or part of the embodiment of the present disclosure can be present in the form of a software product. The computer software product is stored in a storage medium, including a plurality of instructions for enabling a computer device (which can be a personal computer, a server, a network device or the like) to execute all or part of the steps of the methods in the embodiments of the present disclosure. The aforementioned storage medium includes various mediums to store program codes, such as a USB flash disk, a mobile hard disk, a read-only memory (ROM), a random access memory (RAM), a magnetic disk, or an optical disk.

The invention claimed is:

1. A two-dimensional barcode, comprising:
a plurality of generic modules for representing information carried by the two-dimensional barcode; and
at least one encryption module, wherein the encryption module comprises an encryption area and a first identification area, wherein the encryption area records an encryption identifier for verifying authenticity of the two-dimensional barcode, and the first identification area records a first recognition identifier for indicating information carried by the two-dimensional barcode;
further comprising at least one noise module, wherein the noise module comprises a noise area and a second identification area; wherein the noise area records a noise identifier for interfering with the verification of the authenticity of the two-dimensional barcode, and the second identification area records a second recognition identifier for indicating information carried by the two-dimensional barcode;
wherein a degree of similarity between the encryption identifier and the noise identifier is lower than a preset threshold, the degree of similarity between the encryption identifier and the noise identifier is calculated based on one or more of the following information: a degree of shape similarity between the encryption identifier and the noise identifier; a degree of position similarity between the encryption identifier and the noise identifier; a degree of area similarity between the encryption identifier and the noise identifier; and a degree of color similarity between the encryption identifier and the noise identifier.

2. The two-dimensional barcode according to claim 1, wherein the two-dimensional barcode comprises a plurality of the encryption modules, and/or the two-dimensional barcode comprises a plurality of the noise modules.

3. A two-dimensional barcode verification method, wherein the method comprises:
acquiring an image of a two-dimensional barcode to be verified, wherein the image comprises a plurality of generic modules, wherein the plurality of generic modules represent information carried by the two-dimensional barcode;
extracting, from the two-dimensional barcode image, an image feature of a designated area, wherein an encryption module comprises an encryption area and a first identification area; the encryption area records an encryption identifier for verifying authenticity of the two-dimensional barcode, and the first identification area records a first recognition identifier for indicating information carried by the two-dimensional barcode; and
determining, according to the image feature, whether the two-dimensional barcode image is verified;
wherein the step of extracting from the two-dimensional barcode image an image feature of a designated area comprises:
extracting, if there are a plurality of the encryption modules in the two-dimensional barcode image, image features of a plurality of predetermined positions so as to acquire a plurality of image features; and
the step of determining, according to the image feature, whether the two-dimensional barcode image is verified comprises:
determining whether an accuracy of at least one of the image features is greater than a preset threshold, wherein if the accuracy of at least one of the image features is greater than the preset threshold, the two-dimensional barcode image is verified.

4. The method according to claim 3, wherein the two-dimensional barcode image is acquired by photographing or scanning the two-dimensional barcode provided on an object.

5. The method according to claim 3, wherein the step of extracting from the two-dimensional barcode image an image feature of a designated area comprises:
extracting, if there are a plurality of the encryption modules in the two-dimensional barcode image, image features of a plurality of predetermined positions so as to acquire a plurality of image features; and
the step of determining according to the image feature whether the two-dimensional barcode image is verified comprises:
determining whether a mean value of accuracies of all the image features is greater than a preset threshold, wherein if the mean value of the accuracies of all the image features is greater than the preset threshold, the two-dimensional barcode is recognized.

6. The method according to claim 3, wherein the step of extracting from the two-dimensional barcode image an image feature of a designated area comprises:
extracting, if there are a plurality of the encryption modules in the two-dimensional barcode image, image features of a plurality of predetermined positions so as to acquire a plurality of image features; and
the step of determining according to the image feature whether the two-dimensional barcode image is verified comprises:
determining whether an accuracy of at least one of the image features is greater than a preset threshold; and
determining whether a mean value of the accuracies of all the image features is greater than the preset threshold, wherein if the accuracy of at least one of the image features is greater than the preset threshold and the mean value of the accuracies of all the image features is greater than the preset threshold, the two-dimensional barcode is recognized.

7. The method according to claim 3, wherein the step of extracting from the two-dimensional barcode image an image feature of a designated area comprises:
- extracting, if there are a plurality of the encryption modules in the two-dimensional barcode image, image features of a plurality of predetermined positions so as to acquire a plurality of image features; and
- the step of determining according to the image feature whether the two-dimensional barcode image passes the verification comprises:
- determining whether an accuracy of at least one of the image features is greater than a first threshold; and determining whether there is an image feature having an accuracy lower than a second threshold, wherein if the accuracy of at least one of the image features is greater than the first threshold and none of the image features has an accuracy lower than the second threshold, the two-dimensional barcode is recognized.

8. The method according to claim 3, wherein an accuracy of the image features is determined by:
- determining the accuracy of the image feature according to a degree of similarity between the image feature and a reference feature, wherein the degree of similarity comprises one or more of the following: a degree of shape similarity, a degree of size similarity, a degree of position similarity and a degree of color similarity.

9. A two-dimensional barcode verification server, wherein the server is configured to execute a corresponding operation according to the method of claim 3.

10. A method of generating a two-dimensional barcode, wherein the method comprises:
- generating a plurality of generic modules and an encryption module, wherein the plurality of generic modules represent information carried by the two-dimensional barcode, and wherein the encryption module comprises an encryption area and a first identification area, the encryption records an encryption identifier for verifying authenticity of a two-dimensional barcode, and the first identification area records a first recognition identifier for indicating the information carried by the two-dimensional barcode; and
- generating a two-dimensional barcode, wherein the two-dimensional barcode comprises at least one encryption module;
- generating a noise module, wherein the two-dimensional barcode comprises at least one noise module, the noise module comprises a noise area and a second identification area, the noise area records a noise identifier for interfering with verification of the authenticity of the two-dimensional barcode, and the second identification area records a second recognition identifier for indicating information carried by the two-dimensional barcode; and the two-dimensional barcode further comprises at least one noise module;
- wherein a degree of similarity between the encryption identifier and the noise identifier is lower than a preset threshold, the degree of similarity between the encryption identifier and the noise identifier is calculated based on one or more of following information: a degree of shape similarity between the encryption identifier and the noise identifier; a degree of position similarity between the encryption identifier and the noise identifier; a degree of area similarity between the encryption identifier and the noise identifier; and a degree of color similarity between the encryption identifier and the noise identifier.

11. The method according to claim 10, wherein the method further comprises: adjusting the shape and the area of the encryption identifier and the noise identifier according to a printing area of the two-dimensional barcode, wherein a target area ratio is negatively correlated with the printing area of the two-dimensional barcode, and the target area ratio is a ratio of the area of the encryption identifier/noise identifier to the printing area of the two-dimensional barcode.

\* \* \* \* \*

UNITED STATES PATENT AND TRADEMARK OFFICE
CERTIFICATE OF CORRECTION

| | |
|---|---|
| PATENT NO. | : 11,288,475 B2 |
| APPLICATION NO. | : 16/964202 |
| DATED | : March 29, 2022 |
| INVENTOR(S) | : Chin Phek Ong, Wai Keung Ching and Tai Kwong Simon Leung |

It is certified that error appears in the above-identified patent and that said Letters Patent is hereby corrected as shown below:

On the Title Page

Item [72], should read:
Chin Phek ONG, Singapore (SG); Wai Keung CHING, Singapore (SG); Tat Kwong Simon LEUNG, Singapore (SG)

Signed and Sealed this
Twenty-fifth Day of October, 2022

Katherine Kelly Vidal
*Director of the United States Patent and Trademark Office*